(12) United States Patent
Huang

(10) Patent No.: US 8,396,839 B1
(45) Date of Patent: Mar. 12, 2013

(54) REPRESENTING DE-DUPLICATED FILE DATA

(75) Inventor: Mark Huang, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 189 days.

(21) Appl. No.: 12/803,393

(22) Filed: Jun. 25, 2010

(51) Int. Cl.
 *G06F 17/30* (2006.01)
(52) U.S. Cl. ......... 707/664; 707/692; 711/161; 711/162
(58) Field of Classification Search .............. 707/664, 707/692, 999.107, 999.204; 711/161, 162
 See application file for complete search history.

(56) References Cited

U.S. PATENT DOCUMENTS

| | | | |
|---|---|---|---|
| 6,928,526 B1* | 8/2005 | Zhu et al. | 711/154 |
| 7,818,535 B1* | 10/2010 | Bono et al. | 711/173 |
| 8,095,577 B1* | 1/2012 | Faibish et al. | 707/823 |
| 2010/0094817 A1* | 4/2010 | Ben-Shaul et al. | 707/697 |
| 2010/0333116 A1* | 12/2010 | Prahlad et al. | 719/328 |
| 2011/0016091 A1* | 1/2011 | Prahlad et al. | 707/654 |
| 2011/0161291 A1* | 6/2011 | Taleck et al. | 707/622 |
| 2011/0178996 A1* | 7/2011 | Pendlebury et al. | 707/692 |
| 2011/0196869 A1* | 8/2011 | Patterson et al. | 707/737 |
| 2012/0030477 A1* | 2/2012 | Lu et al. | 713/189 |

OTHER PUBLICATIONS

Antognini et al., Bloom Filters, Jun. 20, 2008, pp. 1-7.*

* cited by examiner

*Primary Examiner* — Leslie Wong
(74) *Attorney, Agent, or Firm* — Van Pelt, Yi & James LLP

(57) ABSTRACT

A subset of de-duplicated is outputted. In some embodiments, the output includes a subset of data stored in de-duplicated form in a plurality of containers each including a plurality of data segments comprising the data. For each container that includes one or more data segments comprising the subset, a corresponding container data is included in the output. Each container may include one or more segments not included in the subset. For each container the corresponding container data of which is included in the output, a corresponding value in a data structure including for each container stored on the de-duplicated storage system a data value indicating whether or not the corresponding container data has been included in the output is updated.

24 Claims, 8 Drawing Sheets

REPRESENTING DE-DUPLICATED FILE DATA

BACKGROUND OF THE INVENTION

Deduplication storage systems such as described in U.S. Pat. No. 6,928,526, entitled EFFICIENT DATA STORAGE SYSTEM, filed Dec. 20, 2002 and issued Aug. 9, 2005, the disclosure of which is incorporated herein by reference for all purposes, have been disclosed. In such systems, a stream of data to be stored is divided into segments. Typically a segment is stored on the deduplication storage system only once, even if the segment occurs in more than one file or other object and/or otherwise occurs more than once in the data stream.

On occasion a need arises to generate an output stream comprising a specified subset of a set of data that has been stored in a deduplication storage system. For example, a data owner may wish to create a tape (or other removable or non-removable media) archive of a subset of data stored on a deduplication storage system. One approach that has been used to create a tape archive or other data stream comprising such a subset stored in de-duplicated form, to conserve space on the destination tape or other media, is to "re-inflate" (i.e., reverse deduplication and/or decompress) the data as stored on the deduplication storage system, feed the subset to a second deduplication storage system, then copy the subset as stored in de-duplicated form on the second deduplication storage system to the tape or other media. However, this approach consumes processing resources and time (to re-inflate the data, for example) and the availability of a second deduplication system.

BRIEF DESCRIPTION OF THE DRAWINGS

Various embodiments of the invention are disclosed in the following detailed description and the accompanying drawings.

DETAILED DESCRIPTION

Figure 1:
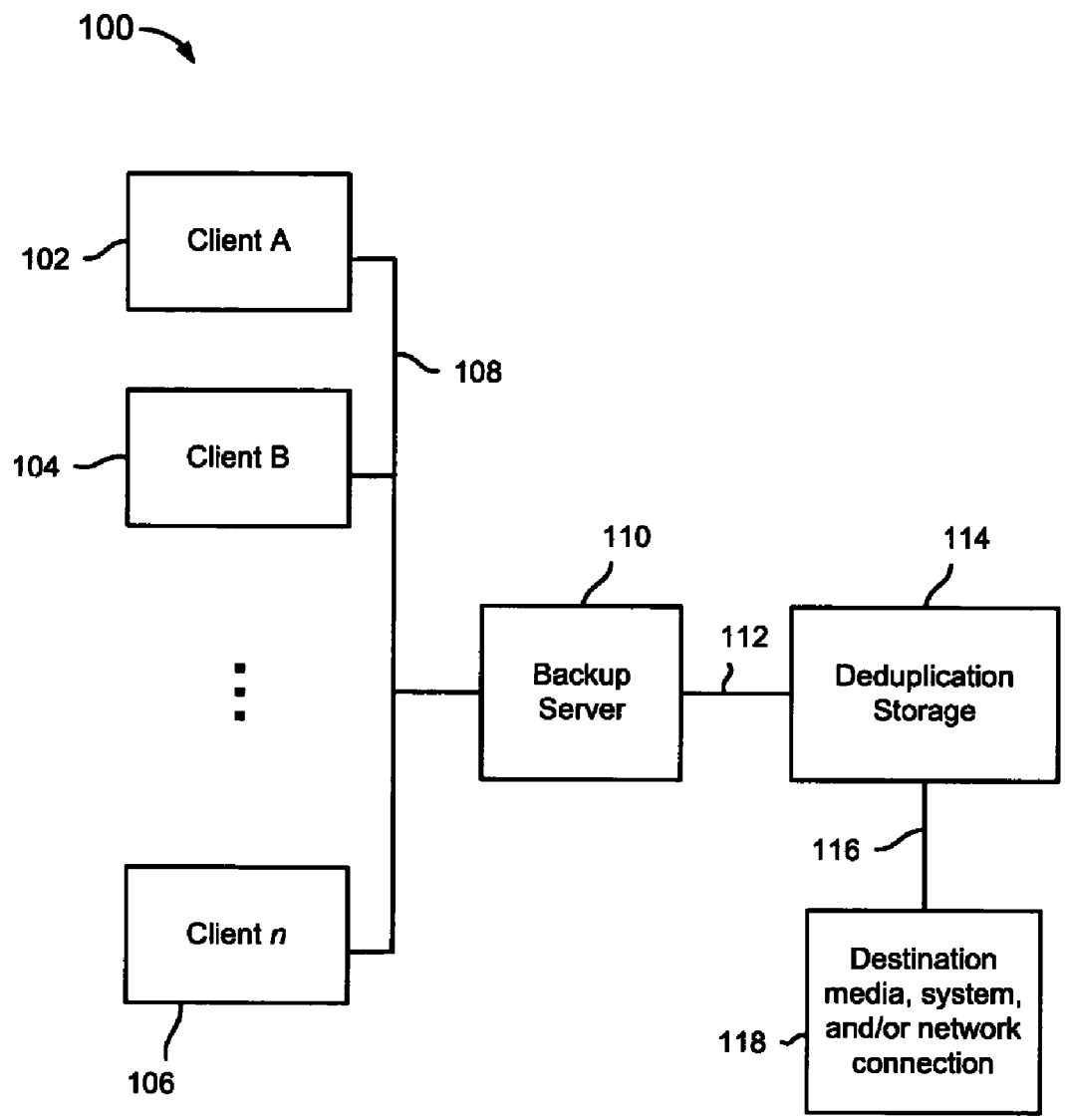
FIG. 1 is a block diagram illustrating an embodiment of a network and associated data storage environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing as output, in a de-duplicated form, a specified subset of a set of data stored on the deduplication storage system, is disclosed. In some embodiments, a segmented data stream received (or generated, for example, by segmenting a received data stream) at the deduplication storage system is de-duplicated by storing fewer instances of each unique segment than are received. Each segment instance is identified by a segment reference and stored in one of a plurality of containers identified by a container identifier ("container ID"). An index is maintained that maps each segment to the container in which it is stored, and for each file or other object included in the stored data an ordered list of references to the segments comprising the file or other object. In some embodiments, if a subset of the data is desired to be provided as output, in a de-duplicated form, the list of segment references comprising each file or other object is included in the output. The index is then used to determine which container(s) include the segment data associated with each file or other object in the subset. As each container is identified, the corresponding container data for the entire container is included in the output stream and a bit mask or other data structure is updated to reflect that the container's data has been included in the output. As each subsequent file or other object is processed, the container(s) that included one or more segments comprising the file or other object are determined and the bit mask or other data structure is checked to determine whether the container(s) has/have been included already in the output. The container data associated with any container determined to contain a segment comprising a file or other object in the subset that has been determined by checking the bit mask or other data structure to not already have been included in the output is written to the output stream and the bit mask or other data structure is updated. In this way, data segments comprising files or other objects included in the subset are provided as output, in de-duplicated form, quickly and efficiently, with minimal overhead and without having to re-inflate the data.

FIG. 1 is a block diagram illustrating an embodiment of a network and associated data storage environment. In the example shown, the network environment 100 includes a plurality of client computer systems and/or other data sources represented in FIG. 1 by clients 102, 104, and 106. The clients are connected via a network 108 to a backup server 110 configured to backup to other storage data stored initially on clients such as clients 102, 104, and 106 and/or other systems. While a backup server 110 and associated clients 102, 104, and 106 are shown in FIG. 1, in various embodiments any source(s) of data to be stored may be used. In the example shown, the backup server 110 provides a backup data stream as output via a connection 112 to a deduplication storage 114. Deduplication storage 114 is configured in various embodiments to provide as output, on a connection 116 to a destination media, system, and/or network connection 118 in the example shown, a specified subset of data as stored in de-duplicated form on deduplication storage 114. For example, in some embodiment destination 118 comprises a tape or other removable storage media. In various embodiments, connection 112 and/or connection 116 comprises network connections and/or other communication interfaces.

Figure 2:
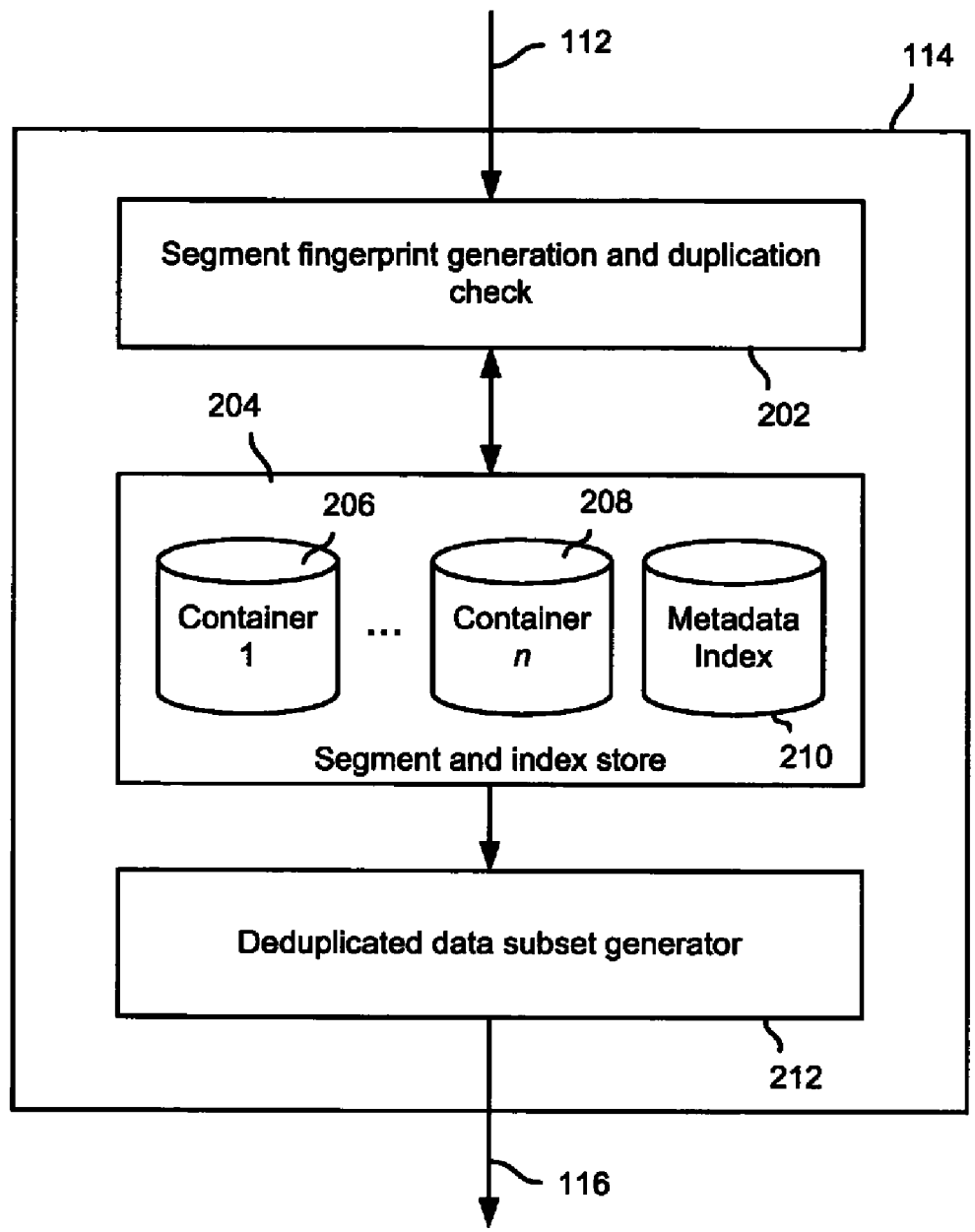
FIG. 2 is a block diagram illustrating an embodiment of a deduplication storage system.

FIG. 2 is a block diagram illustrating an embodiment of a deduplication storage system. In the example shown, deduplication storage system 114 includes a segment reference generation and duplication check engine 202. For each segments received via connection 112 a (likely) unique segment fingerprint, for example a hash or other fingerprint representative of the segment data, is generated. An index, list, or other set of segment fingerprints associated with previously stored segments is checked. If the segment is a duplicate of a previously stored segment a reference to the segment as stored previously is associated with the file or other object with which the currently received segment is associated. Otherwise, the segment is added to a segment and index store 204 by storing the segment data in one of a plurality of containers, represented in FIG. 2 by containers 206 and 208, and index data associating the container, for example by unique container ID, with the segment fingerprint of the segment data is stored in a metadata index 210. In some embodiments, the index data also includes for each segment a segment ID or other data indicating a location of the segment within the container in which it is stored. A de-duplicated data subset generator 212 is configured to receive a designation of a subset of data stored on deduplication storage 114 and provide as output via connection 116 a data stream comprising the designated subset as stored in de-duplicated and, in some embodiments, compressed form on deduplication storage 114. In various embodiments, de-duplicated data subset generator 212 includes in the output data stream the container data stored in each container that includes one or more segments comprising a file or other object included in the subset. In various embodiments, the container data is not decompressed or otherwise re-inflated prior to being provided as output, and instead is written to the output stream. In some embodiments, the data is provided as output in the form in which it is stored on deduplication storage 114. In some embodiments, prior to being provided as output the data is processed into a form other than the form in which it is stored on deduplication storage 114. In various embodiments, de-duplicated data subset generator 212 includes in the output data stream one or more of a file (or other object) header for each file (or other object) included in the subset; container data for any container(s) that include(s) one or more segments comprising the file (or other object), if not already included previously in the output stream by virtue of being associated with another file or other object in the subset; and one or more segment references identifying the segment(s) comprising the file or other object. In various embodiments, one or both of segment fingerprint generation and duplication check engine 202 and de-duplicated data subset generator 212 comprise one or more processes and/or modules running on one or more processors comprising deduplication storage system 114. In various embodiments, segment and index store 204 comprise one or more storage disks, arrays of disks, and/or other data storage devices and/or systems. In various embodiments, for each container identified as including one or more segments comprising a file or other object included in the subset, the de-duplicated data subset generator 212 checks a bit mask or other data structure, stored for example in a memory or other storage location on deduplication storage system 114, to determine whether the corresponding container data has been included already in the output stream. If so, only the file header and segment references for the file or other object currently being processed are written to the output stream. If not, the container data is written to the output stream and the bit mask or other data structure is updated to reflect the fact that the container data for that container has been written to the output stream. In this way, the container data for a container that includes one or more segments required to be included in the output is written to the output stream only once. Note that for each container the corresponding container data may, but will not necessarily, include one or more segments not associated with any file or other object included in the specified subset. In some embodiments, deduplication, garbage collection and/or other processes at a destination system to which the data included in the output stream is provided is configured to remove from the data segments that are not associated with a file or other object included in the specified subset.

Figure 3:
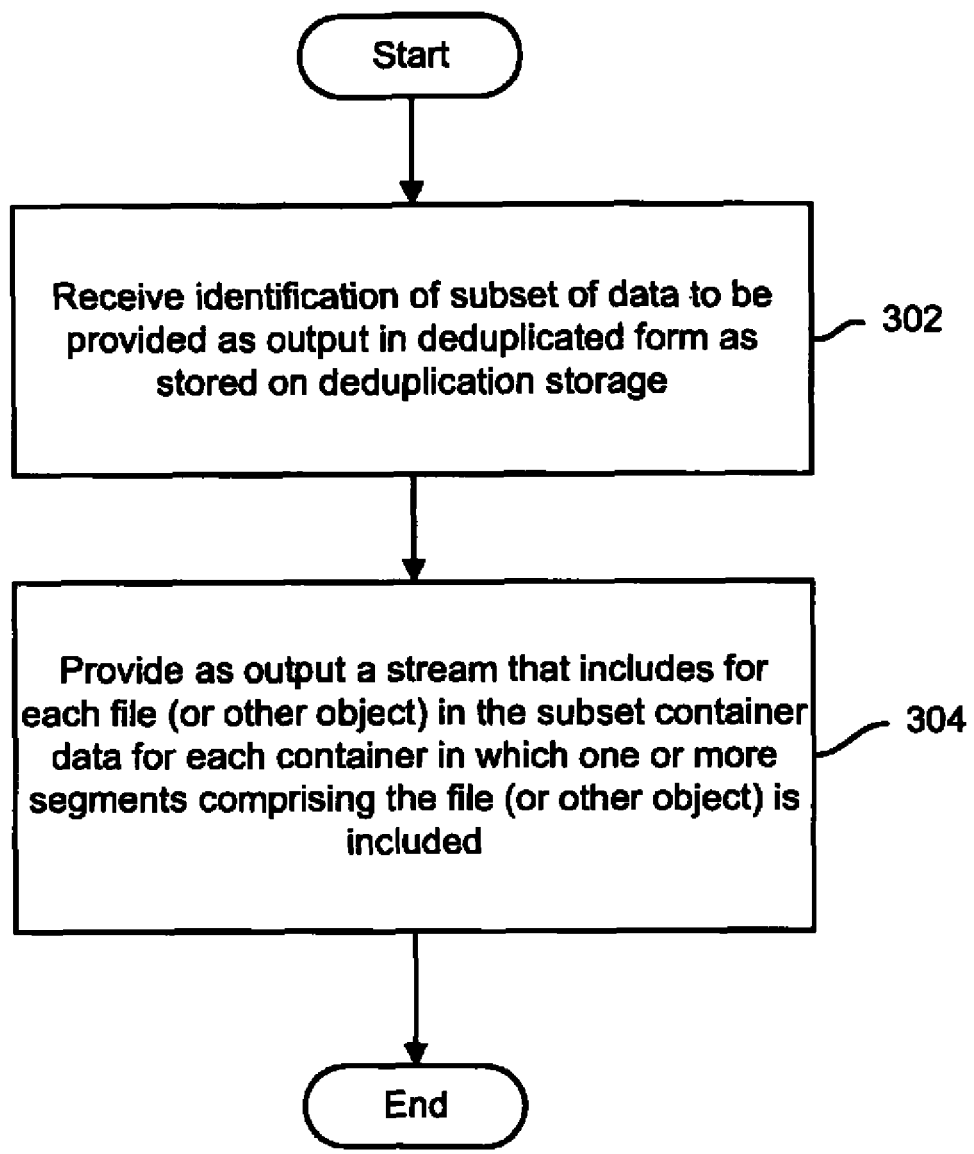
FIG. 3 is a flow diagram illustrating an embodiment of a process for providing as output a subset of data as stored on a deduplication storage system.

FIG. 3 is a flow diagram illustrating an embodiment of a process for providing as output a subset of data as stored on a deduplication storage system. At 302, an identification of the subset of data to be provided as output in the de-duplicated form in which it is stored on the deduplication storage system is received. For example, a directory or subdirectory may be designated to be included in the output. At 304, a data stream that includes container data as stored on the deduplication storage system for each container in which one or more segments comprising a file or other object included in the subset is provided. In various embodiments, the output data stream includes for each file or other object a file or object header; container data for any container that includes one or more segments comprising the file or other object, if not already included previously in the output stream; and one or more segment references identifying the segment(s) comprising the file or other object.

Figure 4:
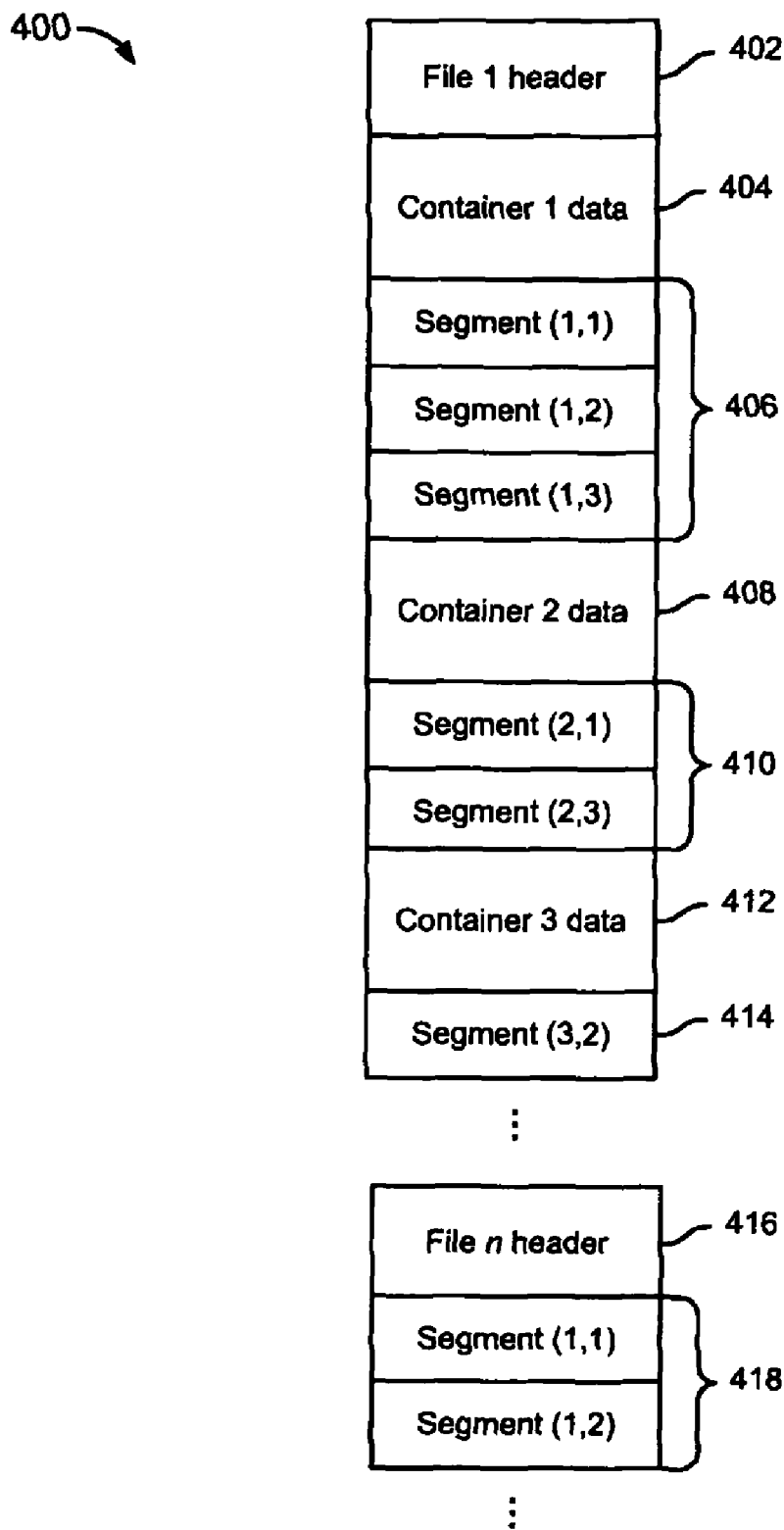
FIG. 4 is a diagram illustrating an example of an output stream as provided in some embodiments.

FIG. 4 is a diagram illustrating an example of an output stream as provided in some embodiments. In the example shown, the output data stream 400 includes a file header 402 for a first file. Segments comprising the first file have been stored in this example in three containers, identified as containers 1, 2, and 3, respectively. As such, a container data 404 corresponding to container 1 is included in the output stream 400. Segment references 406 identify the segments in container 1 that are associated with the first file, in this example, the first, second, and third segments in the container. Likewise, container data 408 corresponding to container 2 is included in the stream 400, followed by segment references 410 to the first and third segments in container 2, which in this example are associated with the first file. Next, container data 412 corresponding to container 3, and segment reference 414 identifying the second segment in container 3 as being associated with the first file, are included in the stream 400. Later in the stream, a file header 416 identifying an n-th file in the subset is included in the stream 400. The n-th file in this example includes the first and second segments stored in the container 1. In various embodiments, the output stream generator by checking a bit mask or other data structure, e.g., as described above, would determine that the entire contents of container 1 had already been written to the output stream 400. As a result, the container data corresponding to container 1 is not included again, and instead the segment references 418 are included in the stream immediately following the file header 416. Note the same would occur if the n-th (or any other) file included one or more segments not referenced by any previously processed file (or other object) but that were included in a container the corresponding container data of which had already been written to the stream 400, for example by virtue of one or more other segments included in that container having been determined to be associated with a previously processed file (or other object).

Figure 5:
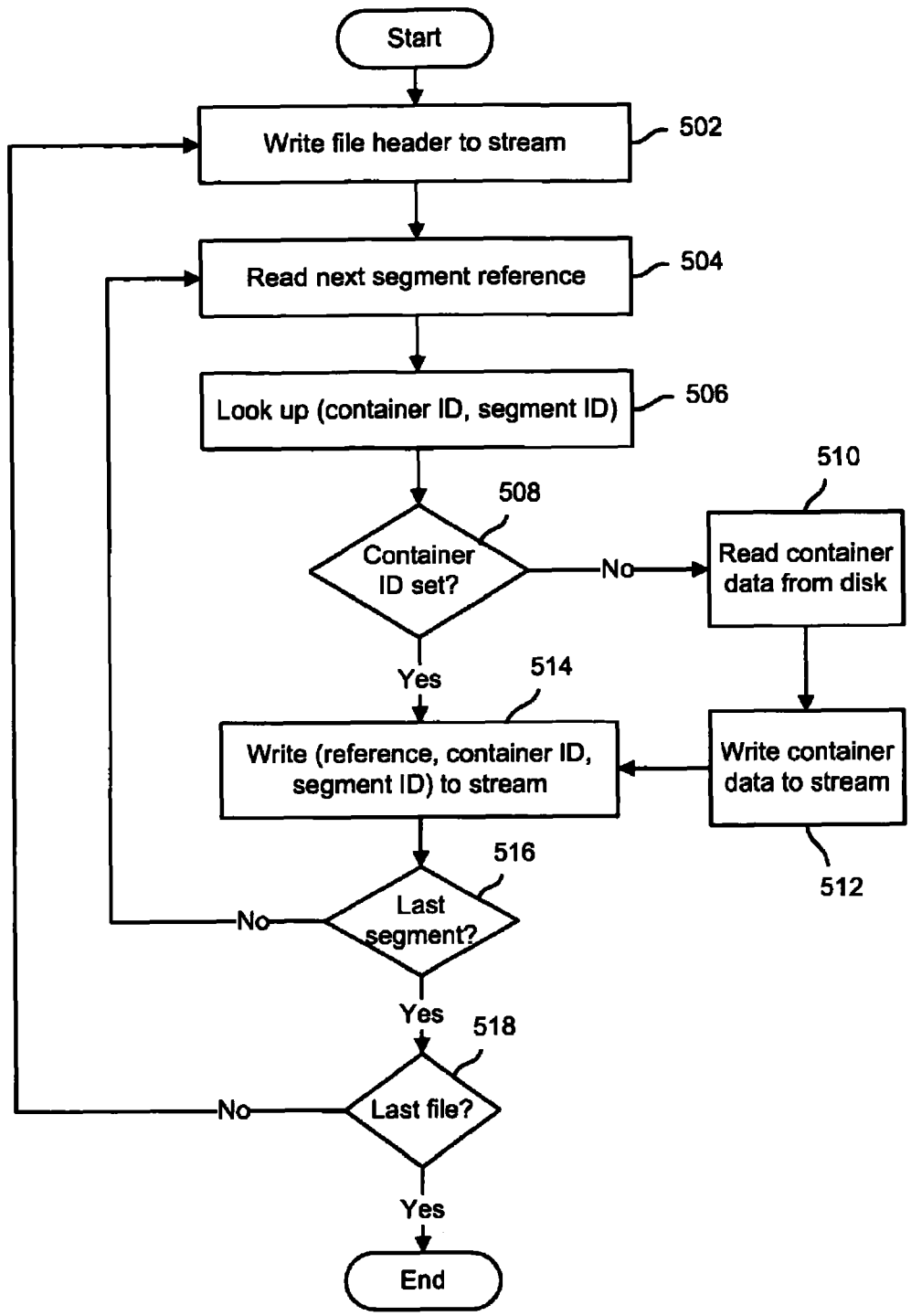
FIG. 5 is a flow diagram illustrating an embodiment of a process for providing as output a subset of data as stored on a deduplication storage system.

FIG. 5 is a flow diagram illustrating an embodiment of a process for providing as output a subset of data as stored on a deduplication storage system. In the example shown, starting with a first file to be included in the subset, a file header is written to the output stream (502). A next segment reference for the file is read (504). The container ID for the referenced segment is looked up (506). In some embodiments, both the container ID and a segment ID or other data indicating a location of the referenced segment within the container are looked up (506). It is determined whether a bit or other data value corresponding to the container ID is set, indicating that the associated container data has been written previously to the output stream (508). If not, the container data is read from disk (510) and written to the output stream (512), and the corresponding container ID bit or other value is set. In some embodiments, container data is written to the output stream in the same form in which it is stored on the deduplication storage system. If the container ID was already set in the bit mask (508), or once the container data has been read and written to the data stream and the container ID set (510-512), the segment reference read at (504) and the container ID looked up at (506) are written to the data stream (514). Successive segments comprising the file are processed accordingly until a last segment comprising the file has been processed (516). Once the last file in the subset has been processed (518) the process of FIG. 5 ends.

Figure 6:
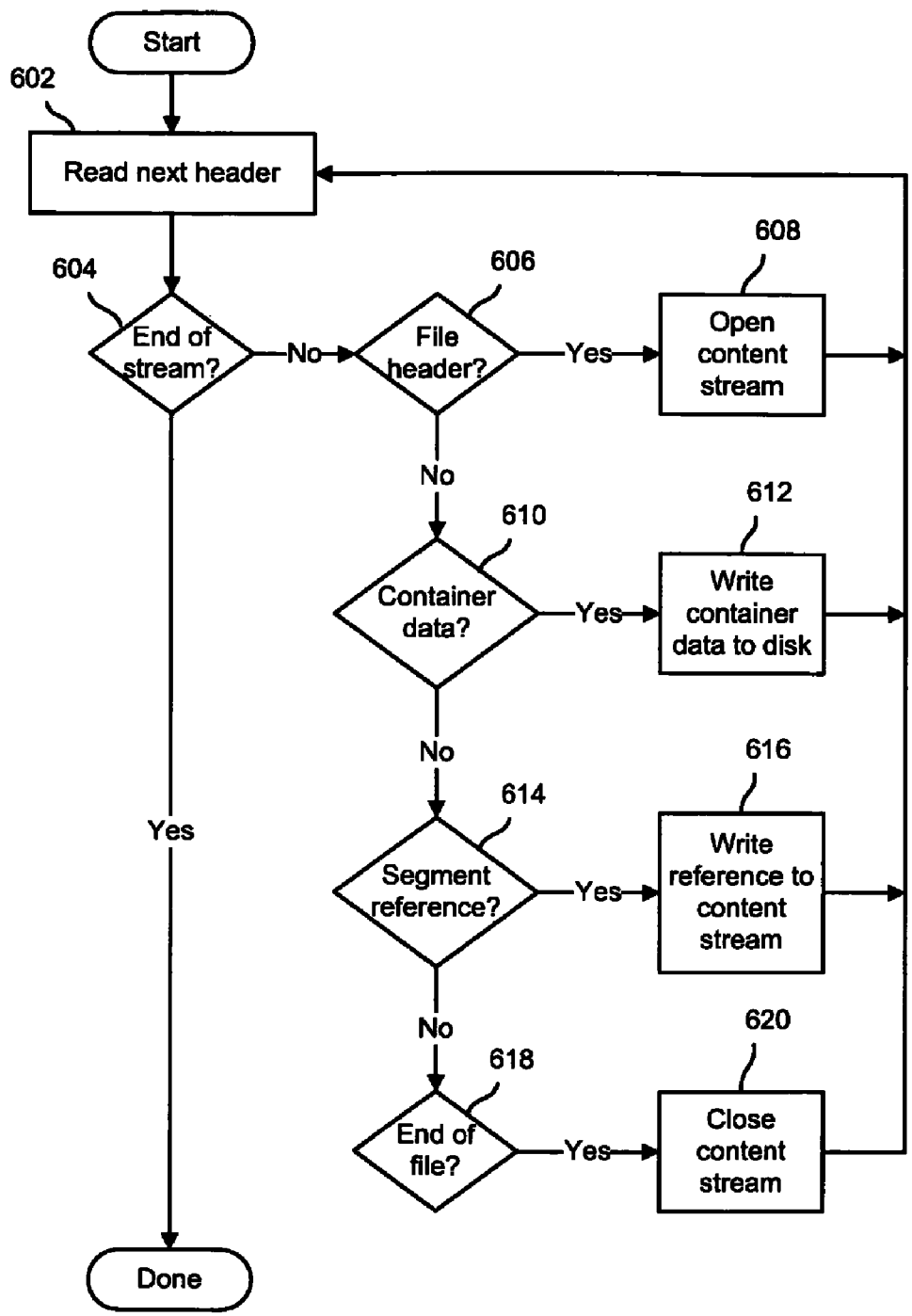
FIG. 6 is a flow diagram illustrating an embodiment of a process for reconstructing a subset of data using a copy of the subset as stored on a deduplication system.

FIG. 6 is a flow diagram illustrating an embodiment of a process for reconstructing a subset of data using a copy of the subset as stored on a deduplication system. In the example shown, the reconstruction is performed on a destination deduplication storage system. In the example shown, a next header included in the data stream is read (602). If the end of the stream has been reached (604), the process ends. Otherwise, if the header is a file header (606) a "content stream" associated with the file is opened (608) on the destination deduplication storage system. In some embodiments, the destination deduplication storage system is configured to use a content stream to store data comprising the file in de-duplicated form. If the header instead identifies the current data in the stream as comprising container data (610), the container data is written to disk on the destination deduplication storage system (612) and indexed. In some embodiments, a container ID (or a new one) may be assigned to identify the container uniquely on the destination deduplication storage system. If the header comprises a segment reference (614), the reference is written (616) to the content stream opened at (608). Finally, if the end of the current file has been reached (618) the associated content stream is closed (620). Successive iterations of the process of FIG. 6 are repeated until the end of the stream is reached (604). In various embodiments, the destination deduplication storage system is configured to perform subsequent processing to verify that all segments comprising all files included in the reconstructed subset are present on the destination deduplication storage system; that all segments are stored only once on the destination deduplication storage system; and/or to remove any segments that may have been included in the data stream by virtue of being included in the same container as a segment comprising a file included in the reconstructed subset but which are not themselves associated with any file included in the reconstructed subset.

Figure 7:
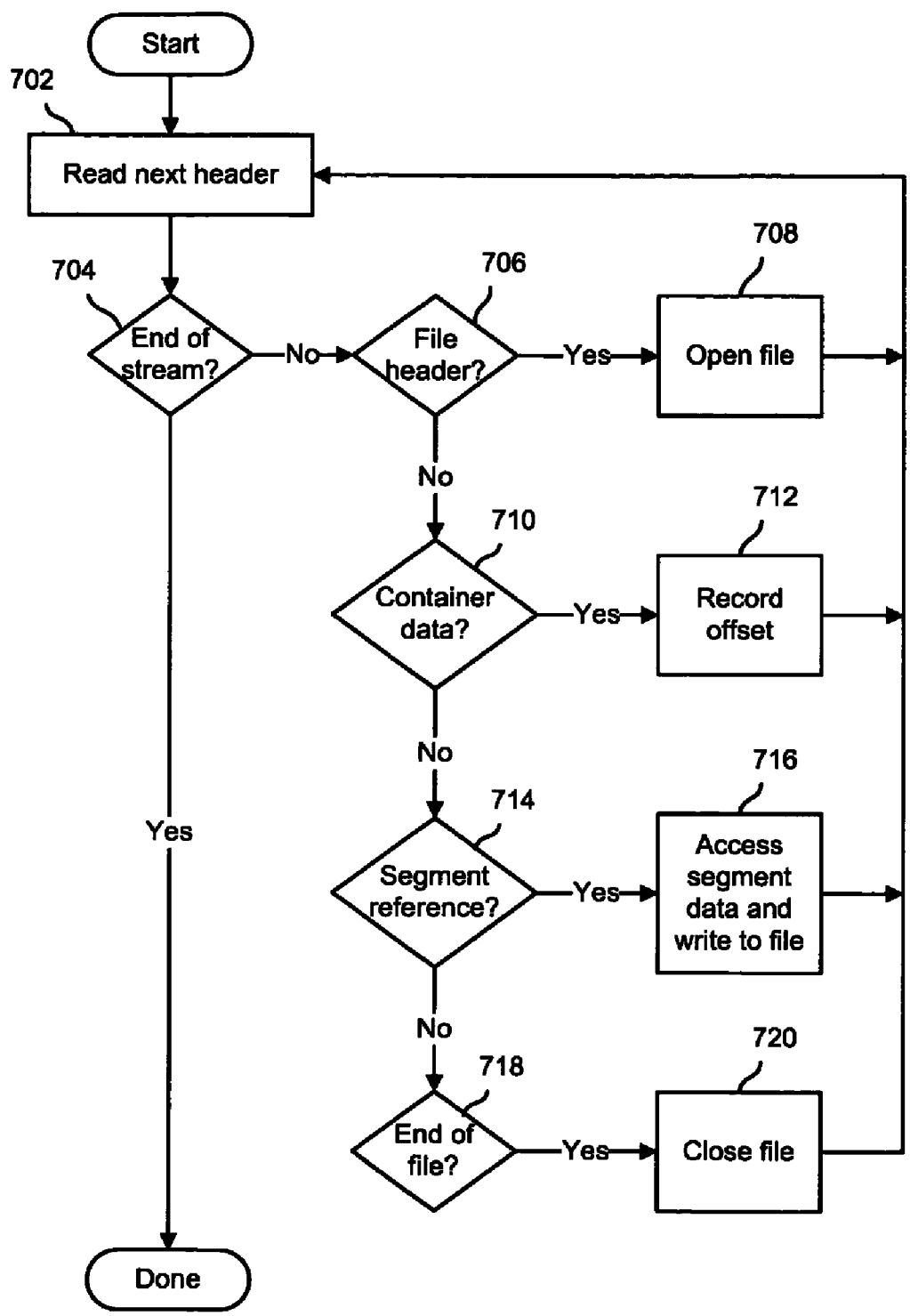
FIG. 7 is a flow diagram illustrating an embodiment of a process for reconstructing a subset of data using a copy of the subset as stored on a deduplication system.

FIG. 7 is a flow diagram illustrating an embodiment of a process for reconstructing a subset of data using a copy of the subset as stored on a deduplication system. In the example shown, the reconstruction is performed on a destination system other than deduplication storage system. In some embodiments, a software client, agent, applet, or other code comprising computer instructions to implement the process of FIG. 7 is installed and executed on the destination system. A next header in the data stream is read (702). If the end of the stream has been reached (704), the process ends. Otherwise, if the header is a file header (706) a corresponding file is opened (708) on the destination system. For example, a file system running on the destination system is instructed to open a file having a name and directory location specified in the file header. If the header instead identifies the current data in the stream as comprising container data (710), an offset indicating where the container data is located within the data stream is recorded (712). In some embodiments, the container offset is recorded in an offset map or other data structure stored in memory in which container ID's and associated offsets are recorded. In some embodiments, the container data is cached and/or indexed locally to generate index data usable to find segments comprising the container data as cached. In some such embodiments, container data offsets are not recorded. In some embodiments, the data stream includes data usable to determine how long to cache container data, for example a count of the number of times segments within the container data are referenced in the stream. Once the container data as cached has been referenced the indicated number of time, the container data is no longer held in the cache. If the header comprises a segment reference (714), the corresponding segment data is obtained and written (716) to the file opened at (708). In some embodiments, the data stream is rewound to the location of the container data comprising the segment, as indicated by the previously stored offset, the data is unpacked (e.g., decompressed), and the segment data corresponding to the referenced segment is read (716). If the end of the current file has been reached (718) the file is closed (720). Successive iterations of the process of FIG. 7 are repeated until the end of the stream is reached (704).

Figure 8:
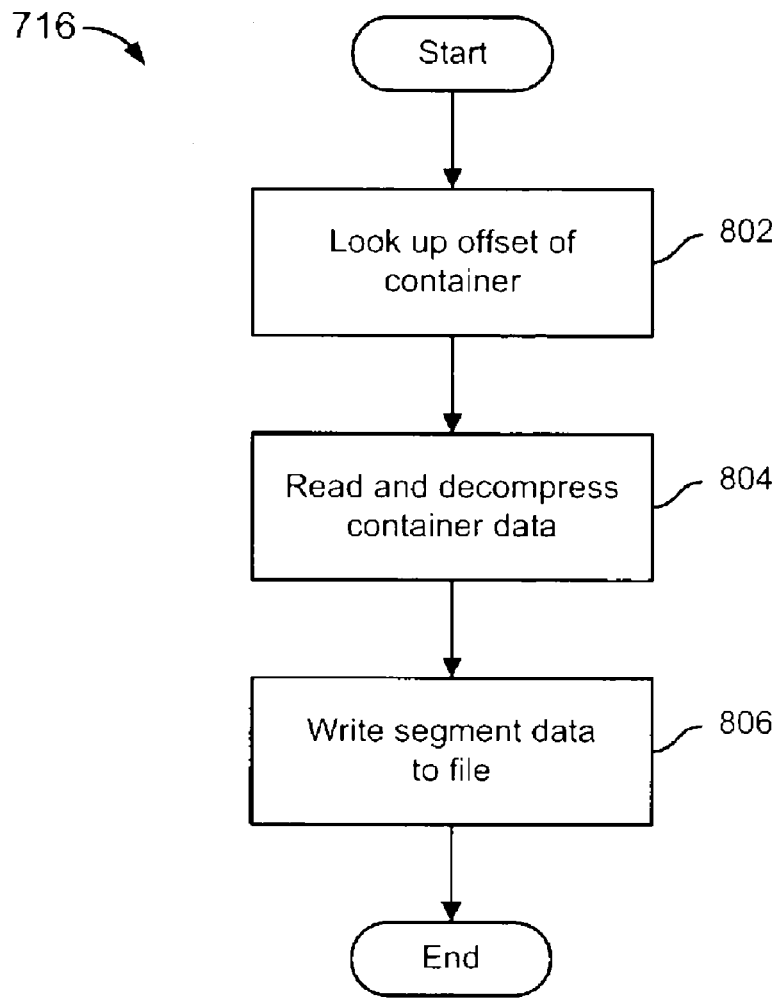
FIG. 8 is a flow diagram illustrating an embodiment of a process for reconstructing a file from a data stream comprising a copy of a subset of data as stored on a deduplication system.

FIG. 8 is a flow diagram illustrating an embodiment of a process for reconstructing a file from a data stream comprising a copy of a subset of data as stored on a deduplication system. In various embodiments, 716 of FIG. 7 comprises the process of FIG. 8. In the example shown, to obtain data comprising a referenced segment the container ID included in the segment reference, and/or determined by referencing an index or other data identifying for each segment the corresponding container the container data of which includes its corresponding segment data, is used to read from the data stored at (712) of FIG. 7 a container data offset indicating where the corresponding container data occurs in the data stream (802). The offset is used to rewind the data stream to the point at which the container data occurs. The container data is read and decompressed (804) and the segment data corresponding to the referenced segment is written to the associated file (806). In some embodiments, the decompressed container data is (or at the option of an administrator may be) cached, for example to facilitate more rapid retrieval of segment data for other segments included in that container.

Using the approaches disclosed herein, a subset of data may be provided as a tape archive or other output from a deduplication storage system in a same de-duplicated (and in some embodiments compressed) form in which it is stored on the deduplication storage system. By including container data for entire containers in the output stream the first time a segment in the container is referenced, eliminating the need to decompress or otherwise unpack container data, and by using a bit mask or other easily read and updated data structure to track which containers have already had their container data included in the stream, the desired output stream can be generated quickly and efficiently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving an indication of an input identifying a subset of data to be provided as output, wherein the subset of data has been stored in de-duplicated form;
   identifying a plurality of containers that includes one or more data segments comprising the subset of data, wherein each of the plurality of containers may include one or more segments not included in the subset of data;
   determining, for each of the plurality of containers, whether corresponding container data has already been included in an output stream based at least in part on a data structure comprising for each of at least a subset of container stored on the de-duplicated storage system an indication of whether or not the corresponding container data has been included in the output stream;
   retrieving a corresponding de-duplicated container data for each container that is determined to comprise container data that has not been previously included in the output stream;
   providing to the output stream the retrieved container data for each container that includes container data that has not been previously included in the output stream; and
   for each container from which corresponding container data is included in the output, updating the corresponding value in the data structure.

2. The method of claim 1, wherein the container data is included in the output in a same form in which it is stored in the de-duplicated storage system.

3. The method of claim 1, further comprising receiving an identification of the subset of de-duplicated data to be provided as output.

4. The method of claim 1, further comprising determining for each of a plurality of files or other objects comprising the subset a set of one or more containers each of which includes one or more segments comprising the file or other object.

5. The method of claim 1, wherein data is stored on the de-duplicated storage in compressed and de-duplicated form.

6. The method of claim 1, wherein the data structure comprises a bit mask.

7. The method of claim 5, wherein the bit mask comprises for each of said plurality of containers a corresponding bit.

8. The method of claim 1, further comprising writing the output to a tape or other removable storage media.

9. The method of claim 1, further comprising identifying a container as including one or more segments comprising the subset and reading from the data structure the data value corresponding to the container to determine whether the corresponding container data has or has not already been included in the output.

10. The method of claim 8, further comprising reading the corresponding container data and writing the corresponding container data to an output stream associated with the output if it is determined by reading the data value corresponding to the container that the corresponding container data has not already been included in the output.

11. The method of claim 1, further comprising receiving the output at a destination deduplication storage.

12. The method of claim 10, wherein the container data included in the output as stored in a de-duplicated storage system comprises compressed data and the destination deduplication storage is configured to write the container data included in the output to disk without decompressing the container data.

13. The method of claim 11, wherein the destination deduplication storage is further configured to index the segments comprising the container data included in the output.

14. The method of claim 1, further comprising receiving the output at a destination system configured to read a segment reference associated with a file comprising the subset; look up a corresponding offset within the output of a container data comprising the segment; read and decompress the container data comprising the segment; and write the segment data to the file as stored on the destination system.

15. The method of claim 13, wherein the destination system is further configured to record in a container offset map, for each set of container data encountered in the output, a corresponding offset or other location of the container data within the output.

16. The method of claim 1, further comprising receiving the output at a destination system configured to cache container data included in the stream.

17. The method of claim 16, wherein the destination system is configured to generate and store an index of segments comprising the cached container data.

18. The method of claim 17, wherein the destination system is configured to read a segment reference in the output and use the index of segments comprising the cached container data to read a segment data associated with the segment reference from the cached container data.

19. A data storage system, comprising:
   a processor configured to provide as output a subset of de-duplicated data stored in de-duplicated form in a plurality of containers each comprising a plurality of data segments comprising the de-duplicated data, including by:
   receiving an indication of an input identifying a subset of data to be provided as output, wherein the subset of data has been stored in de-duplicated form;
   identifying a plurality of containers that includes one or more data segments comprising the subset of data, wherein each of the plurality of containers may include one or more segments not included in the subset of data;
   determining, for each of the plurality of containers, whether corresponding container data has already been included in an output stream based at least in part on a data structure comprising for each of at least a subset of container stored on the de-duplicated storage system an indication of whether or not the corresponding container data has been included in the output stream;
   retrieving a corresponding de-duplicated container data for each container that is determined to comprise container data that has not been previously included in the output stream;

providing to the output stream the retrieved container data for each container that includes container data that has not been previously included in the output stream;

for each container from which corresponding container data is included in the output, updating the corresponding value in the data structure comprising; and a memory coupled to the processor and configured to store the data structure.

20. The system of claim 19, wherein the processor is further configured to determine for each of a plurality of files or other objects comprising the subset a set of one or more containers each of which includes one or more segments comprising the file or other object.

21. The system of claim 19, further comprising a storage device configured to store said corresponding container data.

22. The system of claim 19, wherein the processor is further configured to identify a container as including one or more segments comprising the subset and read from the data structure the data value corresponding to the container to determine whether the corresponding container data has or has not already been included in the output.

23. The system of claim 22, wherein the processor is further configured to read the corresponding container data and write the corresponding container data to an output stream associated with the output if it is determined by reading the data value corresponding to the container that the corresponding container data has not already been included in the output.

24. A computer program product for providing as output a subset of data stored in de-duplicated form in a plurality of containers each comprising a plurality of data segments comprising the data, the computer program product being embodied in a non-transitory computer readable storage medium and comprising computer instructions for:

receiving an indication of an input identifying a subset of data to be provided as output, wherein the subset of data has been stored in de-duplicated form;

identifying a plurality of containers that includes one or more data segments comprising the subset of data, wherein each of the plurality of containers may include one or more segments not included in the subset of data;

determining, for each of the plurality of containers, whether corresponding container data has already been included in an output stream based at least in part on a data structure comprising for each of at least a subset of container stored on the de-duplicated storage system an indication of whether or not the corresponding container data has been included in the output stream;

retrieving a corresponding de-duplicated container data for each container that is determined to comprise container data that has not been previously included in the output stream;

providing to the output stream the retrieved container data for each container that includes container data that has not been previously included in the output stream; and for each container from which corresponding container data is included in the output, updating the corresponding value in the data structure.

* * * * *